United States Patent [19]

Ogawa et al.

[11] Patent Number: 4,766,594

[45] Date of Patent: Aug. 23, 1988

[54] DIGITAL NETWORK SYSTEM HAVING ARRANGEMENT FOR TESTING DIGITAL SUBSCRIBER LINE

[75] Inventors: Yasunori Ogawa, Yokohama; Kenji Tsutsumi, Kawasaki; Yasuo Tanaka; Ryoji Shimozono, both of Yokohama, all of Japan

[73] Assignee: Fujitsu Limited, Kawasaki, Japan

[21] Appl. No.: 863,040

[22] Filed: May 14, 1986

[30] Foreign Application Priority Data

May 20, 1985 [JP] Japan ................................ 60-105952

[51] Int. Cl.⁴ ............................................. H04B 3/46
[52] U.S. Cl. ........................................... 371/22; 379/5
[58] Field of Search ................ 371/22; 370/15; 379/5; 375/10

[56] References Cited

U.S. PATENT DOCUMENTS

| | | | |
|---|---|---|---|
| 3,743,938 | 7/1973 | Davis | 370/15 X |
| 4,039,751 | 8/1977 | Couturier et al. | 370/15 |
| 4,242,750 | 12/1980 | Finck et al. | 371/22 |
| 4,271,513 | 6/1981 | Maejima et al. | 371/22 |
| 4,402,075 | 8/1983 | Bargeton et al. | 370/15 |
| 4,425,662 | 1/1984 | Jeandot | 371/22 X |
| 4,529,979 | 7/1985 | Kusama et al. | 370/15 X |
| 4,547,633 | 10/1985 | Szechenyl | 371/22 X |
| 4,564,933 | 1/1986 | Hirst | 370/15 |
| 4,575,847 | 3/1986 | Fallwell, Jr. et al. | 371/22 X |

*Primary Examiner*—Charles E. Atkinson
*Attorney, Agent, or Firm*—Staas & Halsey

[57] ABSTRACT

A digital network system having an arrangement for testing a digital subscriber line includes a switching device, an exchange terminal device as a subscriber circuit connected with the switching device, a subscriber line connected with the exchange terminal device, a network terminal device at a subscriber's side connected between the subscriber line and terminal equipment devices. The network terminal device includes a turn-around portion for forming a turn-around loop through which the turning-around of a signal to the subscriber line connected with the network termination device is carried out, and a discrimination portion for detecting that data transmission can be carried out and cancelling the formation of the turn-around loop. The turn-around loop is formed when a frame synchronization bit signal from the exchange terminal device is received by the network terminal device and cancelled when the discrimination portion detects that data transmission can be carried out. Communication for either a monitoring of transmission or a bit error testing can be carried out between the network terminal device and the switching device while the turn-around loop is formed, and data transmission between the exchange terminal device and the terminal equipment devices can be carried out after the turn-around loop is cancelled.

7 Claims, 8 Drawing Sheets

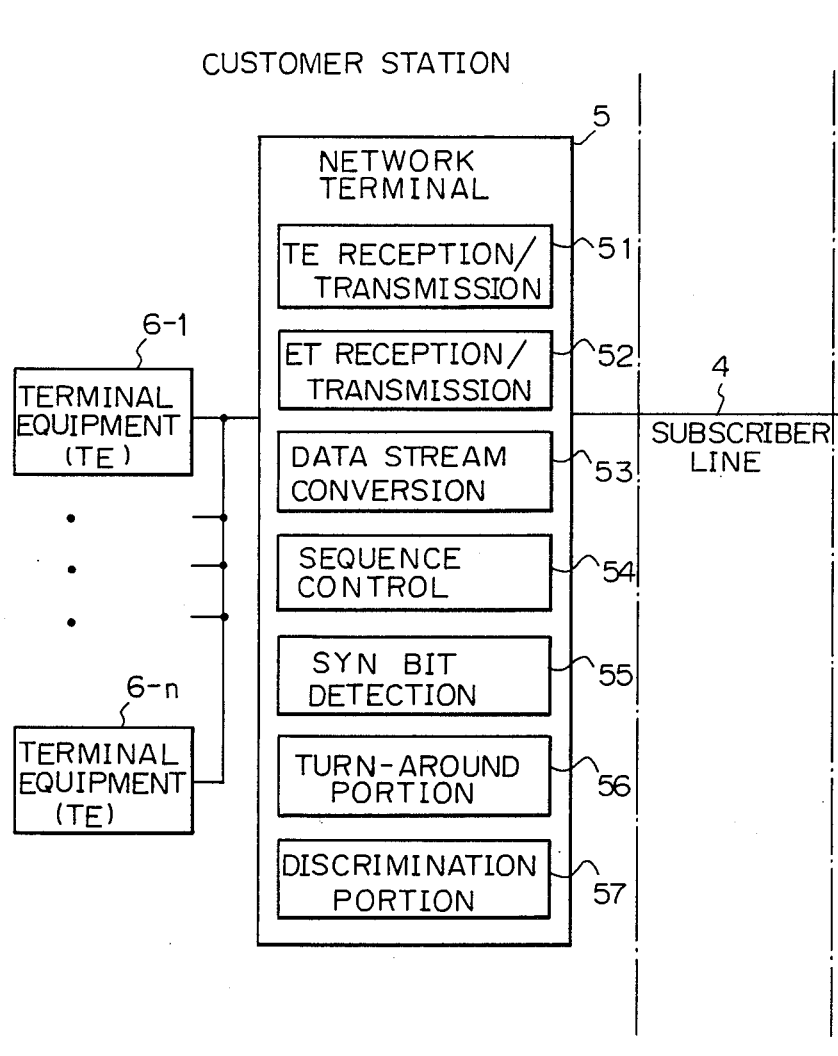

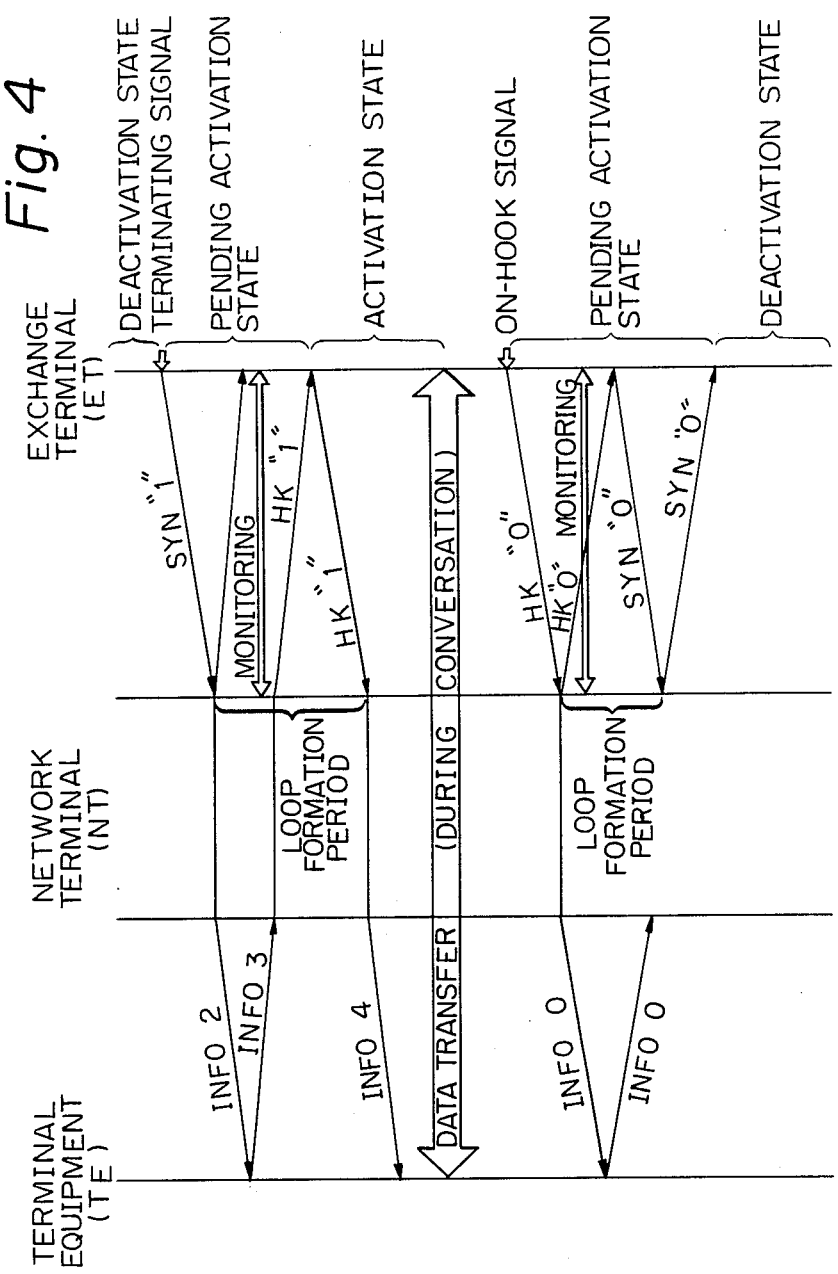

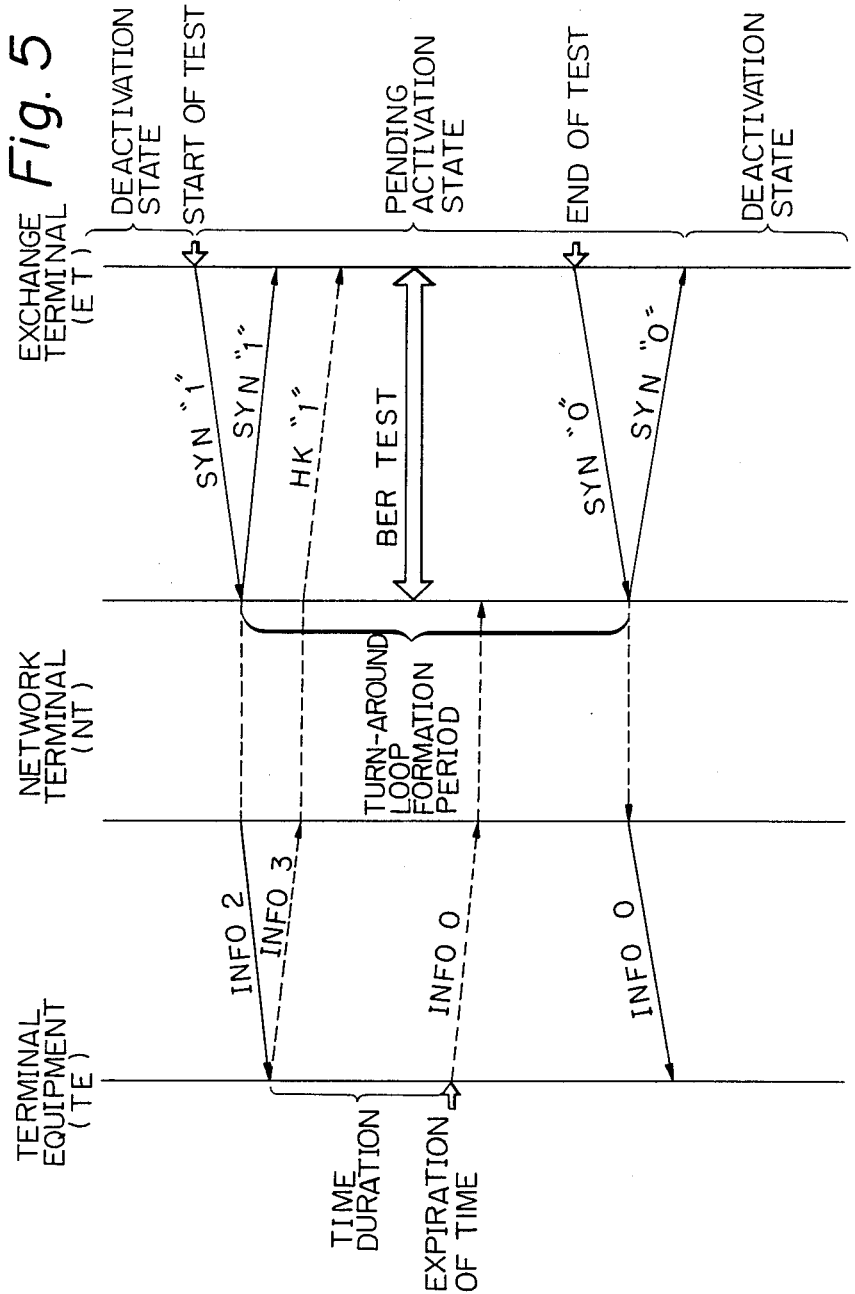

DIGITAL NETWORK SYSTEM HAVING ARRANGEMENT FOR TESTING DIGITAL SUBSCRIBER LINE

BACKGROUND OF THE INVENTION

1. Field of the Invention

The present invention relates to a digital network system having an arrangement for testing a digital subscriber line. The digital network system provides a digital subscriber line testing system for carrying out a transmission test of digital subscriber lines between a subscriber circuit of an exchange station in an integrated services digital network (ISDN) or the like and terminal equipment at customer station lines.

2. Description of the Related Arts

In general, in the integrated services digital network, several kinds of bus type terminal equipment are connected to the terminal equipment of customer station lines, and digital subscriber lines are connected between the terminal equipment of the customer station lines and a subscriber circuit of a subscriber switch.

It is necessary to check these digital subscriber lines to determine whether or not the transmission quality is that desired, as in the case of ordinary transmission lines.

The integrated services digital network (ISDN) is being standardized under the direction of the International Telegraph and Telephone Consultative Committee or CCITT, as described above, and accordingly, the line between a subscriber circuit of a subscriber switch and terminal equipment of customer station lines is connected by a digital subscriber line. As a form of transmission data, for instance, a (2B+D) format is selected that is composed of a channel D of 16 Kb/s and a channel B of 64 Kb/s. A frame synchronization signal bit and a control bit (or a housekeeping bit) are added to the data to comprise one frame. If the control bit is used only for starting the terminal equipment of customer station lines, only one bit will be sufficient for such a control bit. However, where a turn-around loop is formed with this terminal equipment, and a transmission test of the digital subscriber line is carried out, another control bit is necessitated in the prior art to instruct the formation and removal of the above-described turn-around loop, and thus there has been a demand for at least two control bits.

In the digital subscriber line, desirably the effect of crosstalk upon other lines is greatly reduced, relying upon the decline of a transmission bit rate as much as possible, and the transmission line section is lengthened. For this reason, the amount of all control data other than the inherent data must be minimized.

As described before in connection with the prior art digital subscriber line transmissio, there is thought to be a need for at least two control bits, but in accordance with the present invention, it is possible to carry out the formation and elimination of a turn-around loop by means of just one control bit, and to execute a transmission test of the digital subscriber line.

SUMMARY OF THE INVENTION

It is an object of the present invention to provide an improved digital network system having an arrangement for testing a digital subscriber line in which the formation and cancellation of a turn-around loop are carried out by a single control bit so that the transmission test of the digital subscriber line can be achieved.

According to the fundamental aspect of the present invention, there is provided a digital network system having an arrangement for testing a digital subscriber line. The system includes a switching device, an exchange terminal device as a subscriber circuit connected with the switching device, a subscriber line connected with the exchange terminal device, and a network terminal device at a subscriber's side connected between the subscriber line and terminal equipment devices. The network terminal device includes a turn-around portion for forming a turn-around loop through which the turning-around of a signal to the subscriber line connected with the network terminal device is carried out, and a discrimination portion for detecting that data transmission can be carried out, and for cancelling the turn-around loop. The turn-around loop is formed when a frame synchronization bit signal from the exchange terminal device is received by the network terminal device and cancelled when the discrimination portion detects that data transmission can be carried out. Therefore, communication for either transmission monitoring or bit error testing can be carried out between the network terminal device and the switching device while the turn-around loop is formed, and data transmission between the exchange terminal device and the terminal equipment devices can be carried out after the turn-around loop is cancelled.

In accordance with the present invention, there is provided a turn-around portion in the network terminal equipment of a customer station, by which a turn-around loop is formed on the subscriber circuit side of a switching device until data transmission can be carried out. This turn-around portion loops back the testing data from the subscriber circuit. However, when a discrimination circuit detects that data transmission can be carried out, the turn-around loop is eliminated to, thus enabling a transmission test of the digital subscriber line without employing a particular control signal.

BRIEF DESCRIPTION OF THE DRAWINGS

FIGS. 1A and 1B comprise schematic diagram of the digital network system to which the present invention is applied;

FIG. 4 shows a sequence of signal transmission, particularly a sequence of terminating and clear-back; and FIG. 5 shows a sequence of the bit error ratio test.

DESCRIPTION OF THE PREFERRED EMBODIMENTS

Figure 1B:
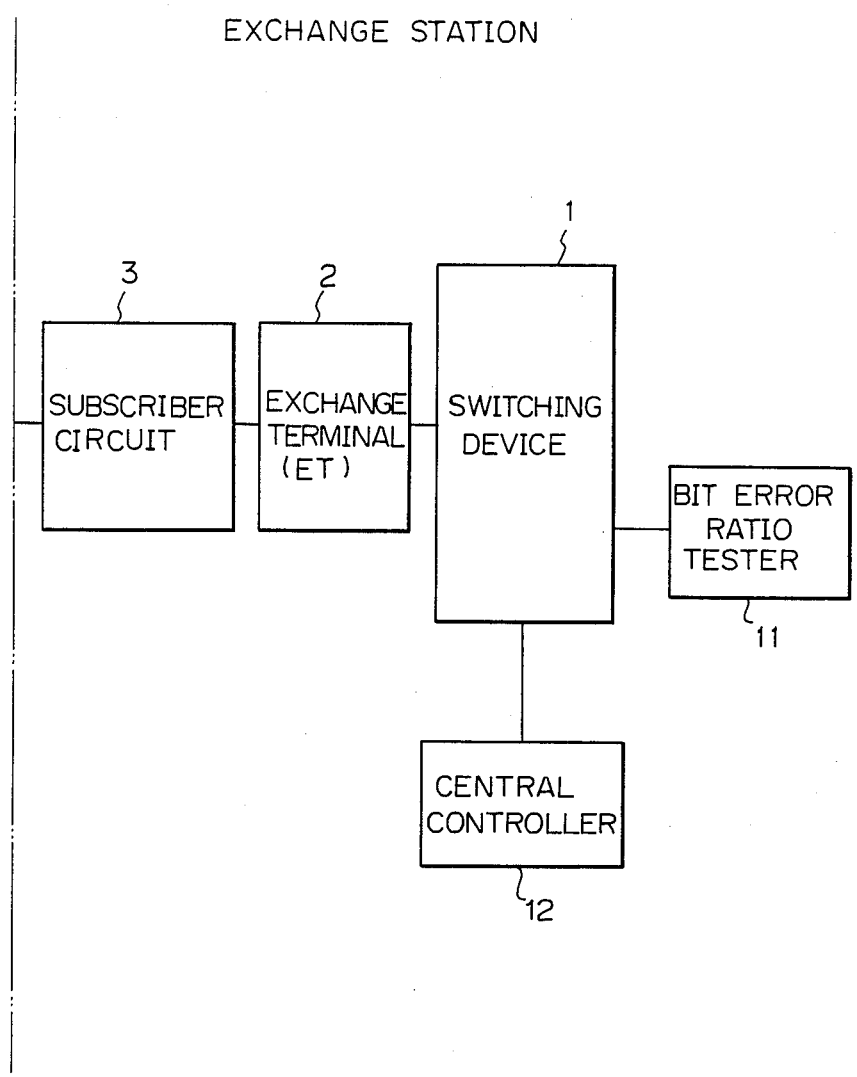

FIGS. 1A and 1B comprise a schematic diagram of the digital network system to which the present invention is applied.

To the right of a subscriber line 4 in FIG. 1A, there is arranged an exchange station shown in FIG. 1B, and to the left, a customer station shown in FIG. 1A.

Figure 2A:
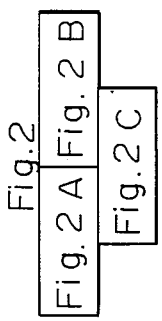
FIGS. 2A, 2B, and 2C comprise a block diagram showing the structure of the network terminal equipment in the system of FIGS. 1A and 1B.
Figure 2A:
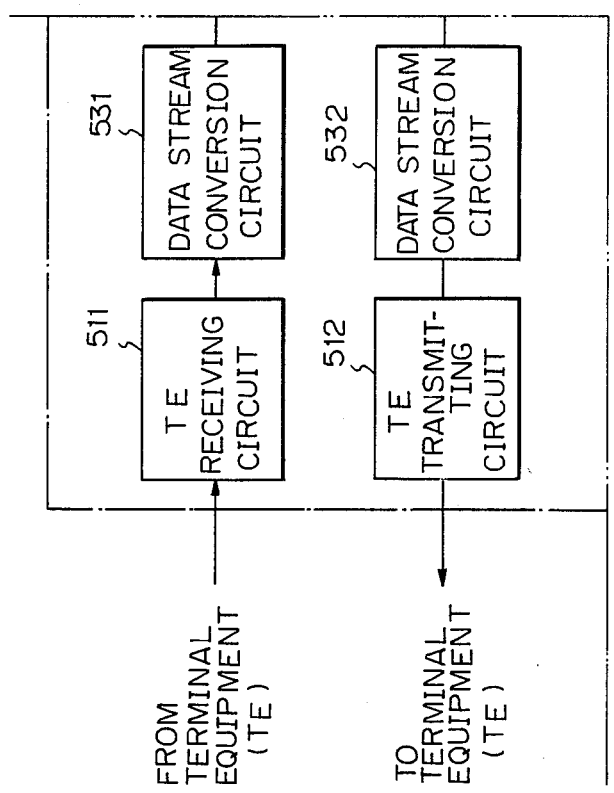
Figure 2B:
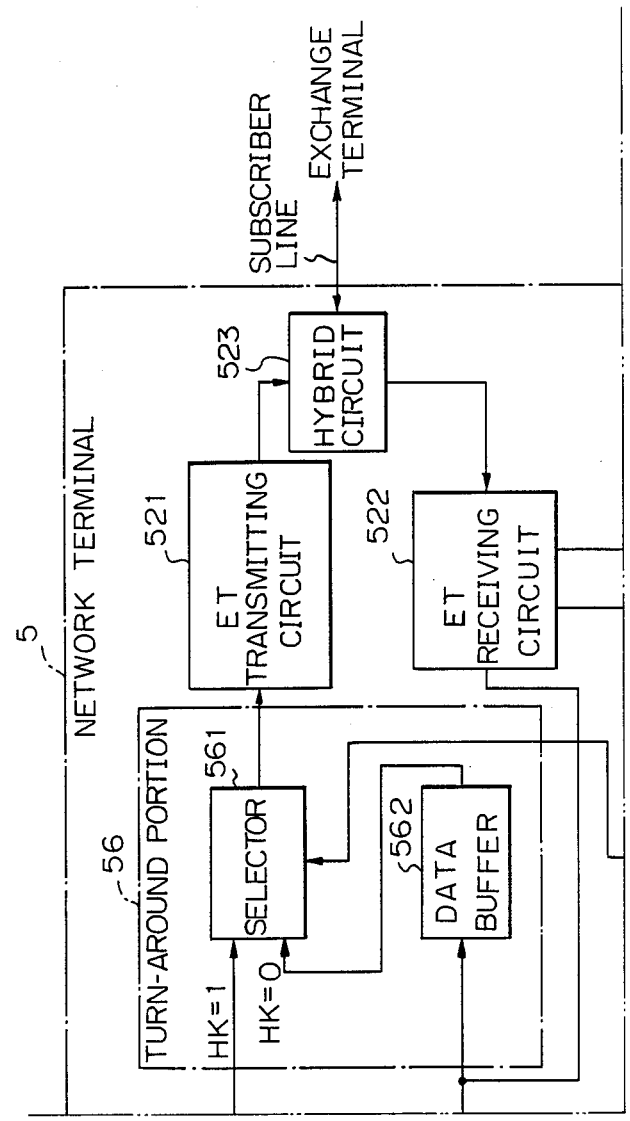
Figure 2C:
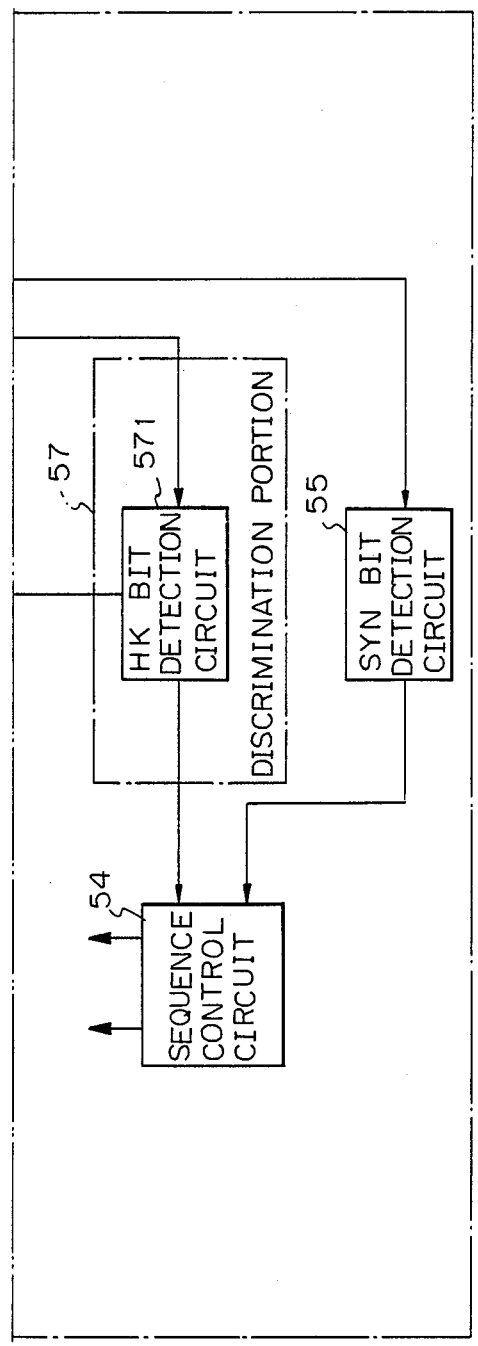

In FIG. 1B, 1 denotes a switching device, 2 an exchange terminal (ET), and 3 a subscriber circuit. A bit error ratio (BER) tester 11 and a central controller 12 are connected to the switching device 1. The subscriber circuit 3 is connected to a network terminal equipment 5 via a subscriber line 4. The network terminal equipment 5 is composed of a TE (terminal equipment) reception and transmission portion 51, an ET (exchange terminal) reception and transmission portion 52, a data stream conversion portion 53, a sequence control circuit 54, a SYN bit detection circuit 55, a turn-around portion 56, and a discrimination portion 57. Details of the network terminal equipment are shown in FIGS. 2A, 2B, and 2C. A plurality of terminal equipment (TE) units 6-1 to 6-n is connected with the network terminal equipment 5.

The network terminal equipment 5, connected to the subscriber circuit 3 and an exchange terminal 2 of the switching device 1 of an exchange station, via the digital subscriber line 4, is provided with a turn-around portion 56 which forms a turn-around loop to the subscriber circuit 3 side and a discrimination portion 57 which discriminates the line status to determine whether or not data transmission can be carried out, thus eliminating the turn-around loop. Until the data transmission can be carried out, the testing data from the bit error ratio tester 11 or the like is turned around via the turn-around loop comprising the turn-around portion 56 to carry out the transmission test of digital subscriber lines 4. When the discrimination portion 57 determines that data transmission can be carried out, the turn-around loop is cancelled to enable a regular data transmission by means of the terminal equipment 6-1 to 6-n.

A description of the mode of operation is given as follows. The network terminal equipment 5 is activated by one bit of the frame synchronization bits transmitted from the subscriber circuit 3 via the digital subscriber line 4 to the network terminal equipment 5, thus enabling a display of the capability of data transmission by means of one bit of the housekeeping bits. Therefore, when the discrimination portion 57 of the network terminal equipment 5 discriminates that data transmission can be carried out, the turn-around loop formed by the turn-around portion 56 is cancelled to enable a regular data transmission, and during a period when the turn-around loop is being formed, the transmission test of the digital subscriber line 4 is carried out.

The invention will now be described in detail below with reference to the accompanying drawing.

FIGS. 2A, 2B and 2C comprise a block diagram showing the structure of the customer station of the line terminal equipment in the system of FIG. 1A. In FIGS. 2A and 2B, TE denotes terminal equipment and ET denotes an exchange terminal on a subscriber circuit side. In FIG. 2A, 511 denotes a TE receiving circuit, 531 a data stream conversion circuit, 532 a data stream conversion circuit, and 512 a TE transmitting circuit. In FIG. 2B, 561 denotes a selector, 521 an ET transmitting circuit for transmitting data to the subscriber circuit ET side, 523 a hybrid circuit, 522 an ET receiving circuit, and 562 a data buffer. The turn-around portion 56 in FIG. 1A comprises the data buffer 562 and the selector 561. In FIG. 2C, 571 denotes an HK bit detection circuit for detecting a control bit (or a housekeeping bit HK), 55 a SYN bit detection circuit for detecting a frame synchronization bit SYN, 54 a sequence control circuit. The discrimination portion 57 is constituted by means of an HK bit detection circuit 571.

To the TE receiving circuit 511 and the TE transmitting circuit 512 of FIG. 2A are connected the bus type terminal equipment TE (not shown in the figure).

The digital subscriber line is arranged between the hybrid circuit 523 of FIG. 2B, and the subscriber circuit of FIG. 1B. Data is transmitted from the ET transmitting circuit 521 via the hybrid circuit 523 to the digital subscriber line, and data transmitted via the digital subscriber line is received by the ET receiving circuit 522 through the hybrid circuit 523.

A frame synchronization bit which is transmitted from the subscriber circuit 3 of an exchange station via the digital subscriber line is detected by a SYN bit detection circuit 55 to carry out a frame synchronization in FIG. 2C. In response to the frame synchronization, the sequence control circuit 54 controls all separate portions of the data stream conversion circuit. The HK bit detection circuit 571 detects a housekeeping bit HK next to the frame synchronization bit SYN from the ET receiving circuit 522, and adds the detected signal to the sequence control circuit 54, and also controls the selector 561.

In FIG. 2B when HK=0 the selector 561 is switched over to select the output of the data buffer 562, a turn-around loop is formed, and HK=1 the selector 561 is switched over to select the output of the data stream conversion circuit 531, normal communication state is established. In this case, it is possible to control the selector 561 so that the turn-around loop is always formed, or the turn-around loop may be formed by activation from the subscriber line ET.

In FIG. 2C, when the HK bit detection circuit 571 detects that data transmission can be carried out, a control is made the turn-around loop is terminated and the output of the data stream conversion circuit 531 is selected. The data stream conversion circuits 531 and 532 of FIG. 2A convert data from the terminal equipment TE into the data format, which is delivered to the digital subscriber line side, and convert data received via the digital subscriber line into the data format, which is delivered to the terminal TE side.

Figure 3:
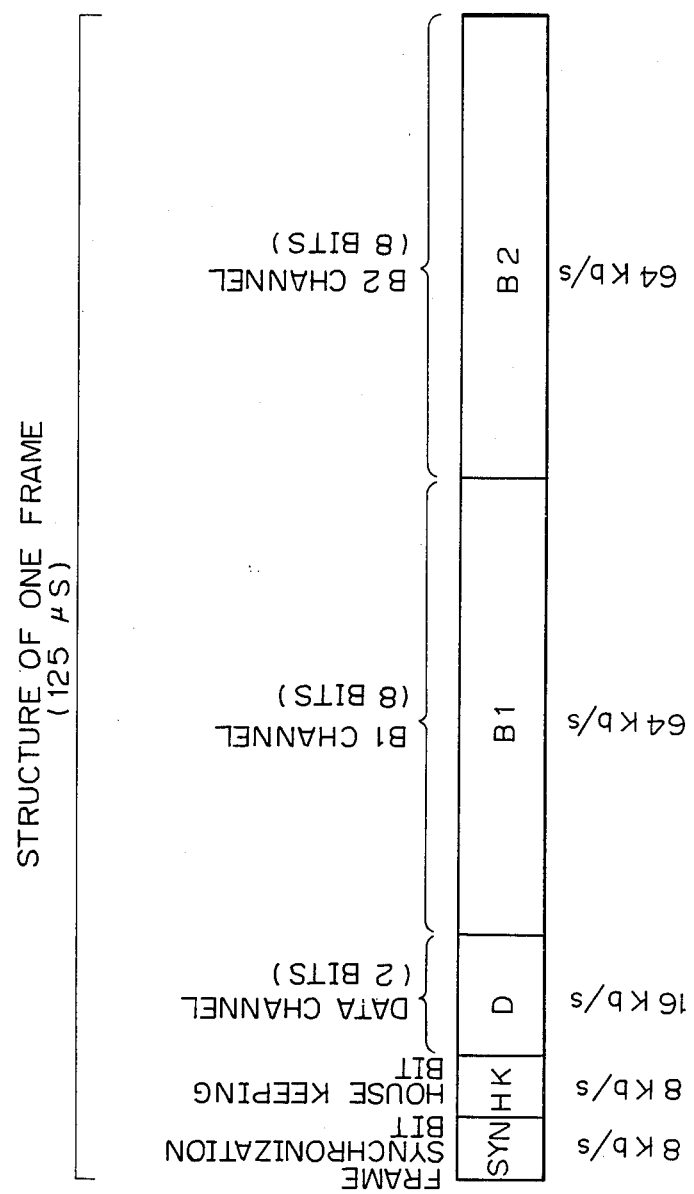
FIG. 3 shows a structure of one frame for explaining a transmission format.

FIG. 3 shows a structure of one frame for explaining a transmission format. One frame is composed of a first frame synchronization bit SYN, a housekeeping bit HK, two bits D channel data D0 and D1, eight B1 channel data bits B10 to B17, and eight B2 channel data bits B20 to B27. Accordingly, the data transmission is carried out depending on the "2B+D" type, which is composed of 16 Kb/s of one D channel and 64 Kb/s of two B channels.

FIG. 4 shows a sequence of signal transmission, particularly a sequence of terminating and clear-back. In FIG. 4, TE denotes a terminal equipment, NT a network terminal equipment, and ET an exchange terminal. When a frame synchronization bit SYN from the subscriber circuit ET is "1" and a housekeeping bit HK is "0", the selector 561 in FIG. 2B selects the output of the data buffer 562 to add the selected output to the ET transmitting circuit 521, thus indicating the formation of a turn-around loop.

When a terminating call is sent to the terminal TE, which is accommodated in the network terminal equipment NT, the subscriber circuit ET of an exchange station, shown as SYN=1, delivers a frame synchronization bit SYN in the transmission frame to the digital subscriber line as "1". In this case, the housekeeping bit HK is "0".

In the network terminal equipment NT, frame synchronization is carried out via a hybrid circuit 523 and ET receiving circuit 522 in the SYN bit detection circuit 55 to detect a frame synchronization bit SYN, and the detected signal is applied to a sequence control circuit 54 and an HK bit detection circuit 571. In this case, as the frame syncnronization bit SYN from the subscriber circuit ET is "1" and the housekeeping bit HK is "0", the selector 561 is controlled to form a turn-around loop.

When activation from the subscriber circuit ET side is once discriminated, the sequence control circuit 54 delivers the frame synchronization bit SYN as "1" in the transmission frame to the subscriber circuit ET side from the ET transmitting circuit 521 to the digital subscriber line. Meanwhile, the housekeeping bit HK is "0", and the network terminal equipment NT delivers a control information data INFO 2, which indicates the terminating state according to the recommendation of CCITT, from the TE transmitting circuit 512 to the terminal equipment (TE) side.

The terminal equipment (TE) receives a control information data INFO 2 to prepare for data receiving operations and once ready for receiving data, a control information data INFO 3, which shows that the terminal equipment is prepared for receving data, is transmitted. When the network terminal equipment NT receives this control information data INFO 3, a housekeeping bit HK, which is now "0", is delivered as "1" to the subscriber circuit ET, shown as HK=1. On the subscriber circuit (ET) side, since the housekeeping bit HK from the network terminal equipment NT has become "1", the housekeeping bit HK in the transmission frame which delivers it to the network terminal equipment NT is regarded as "1".

In the network terminal equipment NT, a housekeeping bit HK of "1" from the subscriber circuit ET is detected by a HK bit detection circuit 571, and since SYN=1 and HK=1, it is discriminated that the data transmission is finished and thus the selector 561 is controlled and the cancellation of the turn-around loop carried out. That is, the selector 561 is switched over from the data buffer 562 to the side of the data stream conversion, and a control information data INFO 4, which shows the data transmission is ready to start, is delivered to the terminal equipment (TE) side to become the state of data transmission (during conversation).

As soon as data transmission is finished, the housekeeping bit HK is made "0" as the subscriber circuit (ET) side. In the network terminal equipment NT, when the housekeeping bit HK "0" is detected by the HK bit detection circuit 571, the selector 561 is controlled to form a turn-around loop. The housekeeping bit HK is delivered as "0" to the subscriber circuit ET and a control information data INFO 0 is also sent to the terminal equipment TE, which shows that the data transmission is completed. When the terminal equipment TE receives the control information data INFO 0, the terminal equipment TE also sends the control information data INFO 0, which denotes that the data transmission is completed.

When the subscriber circuit ET receives the housekeeping bit HK "0" from the network terminal equipment NT, it delivers a frame synchronization bit SYN as "0". As both the housekeeping bit HK and the frame synchronization bit SYN are "0", the network terminal equipment NT controls the selector 561 to remove the turn-around loop.

As described before, the formation and cancellation of the turn-around loop is carried out by one bit of the housekeeping bits HK, and the transmission test of a digital subscriber line can be carried out from the subscriber circuit ET side during the formation period of the turn-around loop in the network terminal equipment NT. That is, when testing data is delivered from the subscriber circuit ET side, the data is received via the hybrid circuit 523 by the ET receiving circuit 522. The received data is transferred to the data buffer 562. As the content of the data buffer 562 is applied to the ET transmitting circuit 521 via the selector 561, the testing data is looped back from the ET transmitting circuit 521 via the hybrid circuit 523 to the subscriber circuit side.

FIG. 5 shows a sequence of the bit error ratio test. When a frame synchronization bit SYN is made "1", a test activation can be carried out from the subscriber circuit ET side. Similar to the on-hook activation, the network terminal equipment NT sends a control information data INFO 2 to the terminal TE to deliver a frame synchronization bit SYN "1" to the subscriber circuit ET.

Corresponding to the control information INFO 2, the terminal equipment TE delivers a control information INFO 3 and the network terminal equipment NT receives this control information INFO 3 to deliver the housekeeping bit HK as "1" to the subscriber circuit ET. On the contrary, for the test activation, the subscriber circuit ET leaves the housekeeping bit HK of the transmission frame which is sent to the network terminal equipment NT as "0". The terminal equipment TE receives the control information INFO 2 which shows the on-hook state, and after the lapse of a definite time delivers the control information INFO 3 which shows the response thereto. Since the terminal equipment TE cannot receive the control information INFO 4, it delivers the control information data INFO 0 in the time-out state.

As both the frame synchronization bit SYN is "1" and the housekeeping bit HK is "0" in the network terminal equipment NT, the state wherein a turn-around loop is being formed is maintained, thus turning around the testing data from the subscriber circuit ET side. Therefore, the transmission test for the digital subscriber line can be carried out.

The subscriber circuit ET delivers the frame synchronization bit SYN as "0" upon termination of the test, while the network terminal equipment NT delivers the control information INFO 0, which represents the termination of data transmission, to the terminal equipment TE and delivers the frame synchronization bit SYN of "0" to the subscriber circuit, the sequence for the transmission test is then terminated.

We claim:

1. A digital network system for testing a digital subscriber line, said system comprising a switching device, an exchange terminal device and a subscriber circuit connected with said switching device, the digital subscriber line being connected with said exchange terminal device through the subscriber circuit, and a network terminal device and terminal equipment devices at a subscriber's side of the system, the network terminal devices being connected between the subscriber line and the terminal equipment devices, said network terminal device comprising:

turn-around means for forming a turn-around loop through which a signal is turned around to the subscriber line connected with said network terminal device, in response to receipt of a frame synchronization bit signal from the exchange terminal device by the network terminal device; and discrimination means for detecting that data transmission can be carried out and, in response to such detecting, for cancelling said turn-around loop;

whereby communication for either monitoring of transmission or bit error testing can be carried out between the network terminal device and the switching device while said turn-around loop is formed, and data transmission between the exchange terminal device and the terminal equipment devices can be carried out after the turn-around loop is cancelled.

2. The system of claim 1, wherein the turn-around means responds substantially solely to the receipt of the frame synchronization bit signal and independently of any other, predetermined signal instructing the formation of the turn-around loop, for forming the turn-around loop and thereby enabling either monitoring of transmission or bit error testing between the network terminal device and the switching device through the turn-around loop.

3. A digital network system having an exchange station and a customer station, for testing a digital subscriber line connected between the exchange station and the customer station, said exchange station comprising a switching device, an exchange terminal device and a subscriber circuit, the subscriber circuit being connected through the exchange terminal device with the switching device and the subscriber line being connected with the subscriber circuit, and the customer station comprising terminal equipment units and a network terminal device connected between the digital subscriber circuit and the terminal equipment units, said network terminal device comprising:

turn-around means for forming a turn-around loop through which a signal is turned-around to the subscriber line connected with said network terminal device in response to receipt of a frame synchronization bit signal from the exchange terminal and thereby enabling either monitoring of transmission or bit error testing between the network terminal device and the switching device through the turn-around loop; and discrimination means for detecting that data transmission can be carried out and, in response to such detecting, for cancelling the turn-around loop and thereupon establishing a transmission path to enable data transmission between the exchange terminal device and the terminal equipment devices.

4. The system of claim 3, the turn-around means comprising a data buffer connected to the subscriber line, and switching means for alternately selecting information from the data buffer and from the terminal equipment devices.

5. The system of claim 4, the discrimination means, further, detecting a control bit that is generated by the exchange terminal device and controlling the switching means in accordance with the detected control bit.

6. The system of claim 3, wherein the turn-around means responds substantially solely to the receipt of the frame synchronization bit signal and independently of any other, predetermined signal instructing the formation of the turn-around loop, for forming the turn-around loop and thereby enabling either monitoring of transmission or bit error testing between the network terminal device and the switching device through the turn-around loop.

7. The system of claim 6, wherein the transmission data format includes control data and information data and wherein the discrimination means responds substantially only to control data and not to information data for selectively establishing and releasing the transmission path.

* * * * *

UNITED STATES PATENT AND TRADEMARK OFFICE
CERTIFICATE OF CORRECTION

PATENT NO. : 4,766,594
DATED : August 23, 1988
INVENTOR(S) : Ogawa et al.

It is certified that error appears in the above-identified patent and that said Letters Patent is hereby corrected as shown below:

Col. 1, line 57, "transmissio" should be --transmission--.

Signed and Sealed this

Twenty-fourth Day of January, 1989

Attest:

DONALD J. QUIGG

*Attesting Officer*  *Commissioner of Patents and Trademarks*